Nov. 22, 1949     V. DAHLMAN     2,488,712
ELECTRICAL DUST-PRECIPITATING UNIT
Filed May 1, 1945     3 Sheets-Sheet 1
Fig. 1
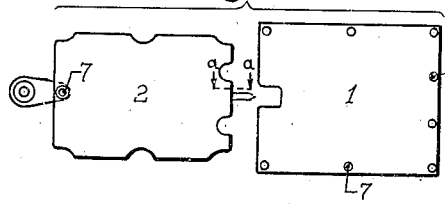
Fig. 2
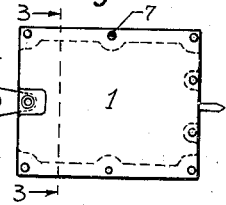
Fig. 3
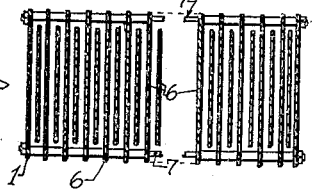
Fig. 4
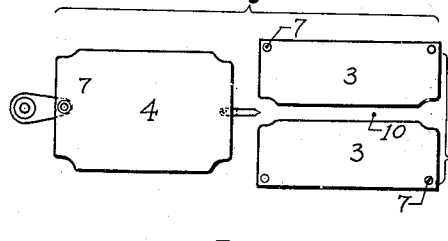
Fig. 5
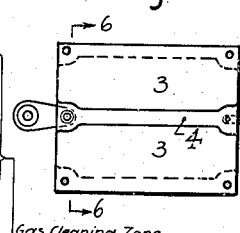
Fig. 6
Fig. 7
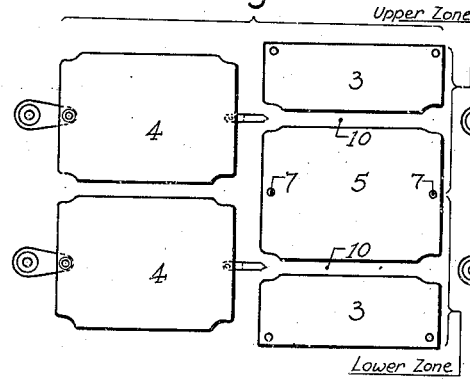
Fig. 8
Fig. 9
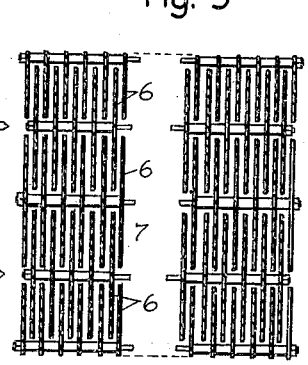
Fig. 10
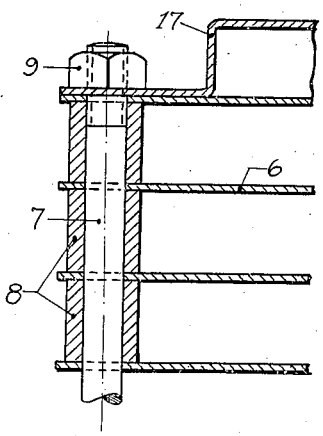
Fig. 1a
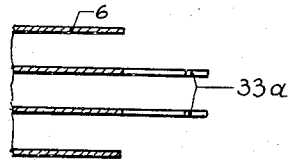
INVENTOR.
Verner Dahlman
BY
Arthur F. Robert
atty.

Nov. 22, 1949 V. DAHLMAN 2,488,712
ELECTRICAL DUST-PRECIPITATING UNIT
Filed May 1, 1945 3 Sheets-Sheet 2

INVENTOR.
Verner Dahlman
BY
Arthur J. Robert
Atty.

Nov. 22, 1949  V. DAHLMAN  2,488,712
ELECTRICAL DUST-PRECIPITATING UNIT
Filed May 1, 1945  3 Sheets-Sheet 3

INVENTOR.
Verner Dahlman
BY
Arthur F. Robert
atty

Patented Nov. 22, 1949

2,488,712

UNITED STATES PATENT OFFICE 2,488,712

ELECTRICAL DUST-PRECIPITATING UNIT

Verner Dahlman, Louisville, Ky., assignor to American Air Filter Company, Inc., Louisville, Ky., a corporation of Delaware Application May 1, 1945, Serial No. 591,283

24 Claims. (Cl. 183—7)

1

This invention relates to electrical dust-precipitating units of the interleaved spaced parallel plate electrode type.

Units of this character are commonly made in the form of open-ended box-like cells of standard sizes. Each cell usually comprises: a box-like housing open at opposite end faces to accommodate a gas flow therethrough; and a plate assembly composed of at least two electrically opposite series of spaced parallel plates arranged in operative interleaving relationship wherein successive plates of one series centrally extend into successive spaces between plates of the electrically opposite series and cooperate therewith to form a series of gas flow passages, one passage between each pair of electrically opposite plates. Ordinarily the plate assembly is more or less rigidly and permanently mounted in the housing with the plates, of one series, electrically grounded upon the housing, and, of the electrically opposite series, electrically insulated from the housing.

In operation, each cell is placed in an air or gas duct with an ionizer positioned in or adjacent to its open inlet face so that the air flow in the duct first passes through the ionizer and then between the plates of the cell. The ionizer and the plates of the cell are both charged with appropriate operating voltages in order to impart electrical charges to the dust particles contained in the air passing through the ionizer and to precipitate the charged dust particles upon the plates as the air passes between plates. After a period of operation, the installation is shut down and the plates of each cell reconditioned, i. e. cleaned and recoated. Ordinarily the plates are reconditioned by washing them with hot water or steam to remove the collected dirt and then coating them with a dust wetting liquid, such as oil, to condition them for further operation.

As a rule the cleaning operation succeeds in removing most of the deposited dust but usually some of the dust clings to the plates with such tenacity as to resist the washing action successfully. With time, these tenacious deposits grow so that ultimately it becomes desirable to clean the plates thoroughly. This is a major undertaking of an exceedingly troublesome nature since it is complicated not only by the necessity in most cases of cleaning the cells in situ but also by the exceedingly narrow spaces between plates making cleaning access difficult. Cleaning access to the cells is often further handicapped by limited working space adjacent the installation.

The principal object of the present invention is to provide an electrical dust-precipitating unit of

2 the interleaved spaced parallel plate type, which substantially avoids some of the foregoing objections and entirely eliminates most, if not all, of the others.

Another object is to provide a novel and simply constructed unit in which the plate assemblies are constructed and arranged for insertion into and removal from the housing so that they can be easily and quickly removed for reconditioning purposes and, if desired, immediately replaced by reconditioned spare assemblies.

Another object is to provide a novel and simply constructed unit in which separate plate assemblies of opposite electrical sign are removably supported in an operative position within the housing with their plates in operative interleaving relationship, that is to say, successive plates of an assembly of one electrical sign centrally extend into successive spaces between the plates of an assembly of the opposite electrical sign.

A further object is to provide, in an electrical dust-precipitating unit having a housing and separate plate assemblies of opposite electrical sign positioned in the housing with their plates in operative interleaving relationship, a novel arrangement for removably supporting each assembly upon the housing independently of the other.

The invention is illustrated in the accompanying drawings in which Figures 1–9 are more or less schematic while the remaining figures show structural details. In said drawings:

Figure 1 is an end elevational view of a pair of electrically opposite plate-electrode assemblies separated from each other;

Figure 1a is a fragmentary section along line a—a of Figure 1;

Figure 2 is an end elevational view of the same assemblies in their operative interleaving relationship;

Figure 3 is a section along line 3—3 of Figure 2 with the securing means along one vertical face omitted for the sake of clearness; the securing means otherwise being shown in elevation;

Figure 4 is an end elevational view of a second arrangement of electrically opposite plate-electrode assemblies separated from each other;

Figure 5 is an end elevational view of the second arrangement of assemblies in their operative interleaving relationship;

Figure 6 is a section along line 6—6 of Figure 5 with the plate securing means in elevation;

Figure 7 is an end elevational view of a third arrangement of electrically opposite plate-electrode assemblies separated from each other;

Figure 8 is an end elevational view of the assemblies of the third arrangement in their operative interleaving relationship;

Figure 9 is a section along line 9—9 of Figure 8 with the plate securing means in elevation;

Figure 10 is a fragmentary sectional view of a specific form of grounded plate assembly, this view illustrating the plate securing means used in the assemblies of 1-9;

Plate assemblies

Figure 11:
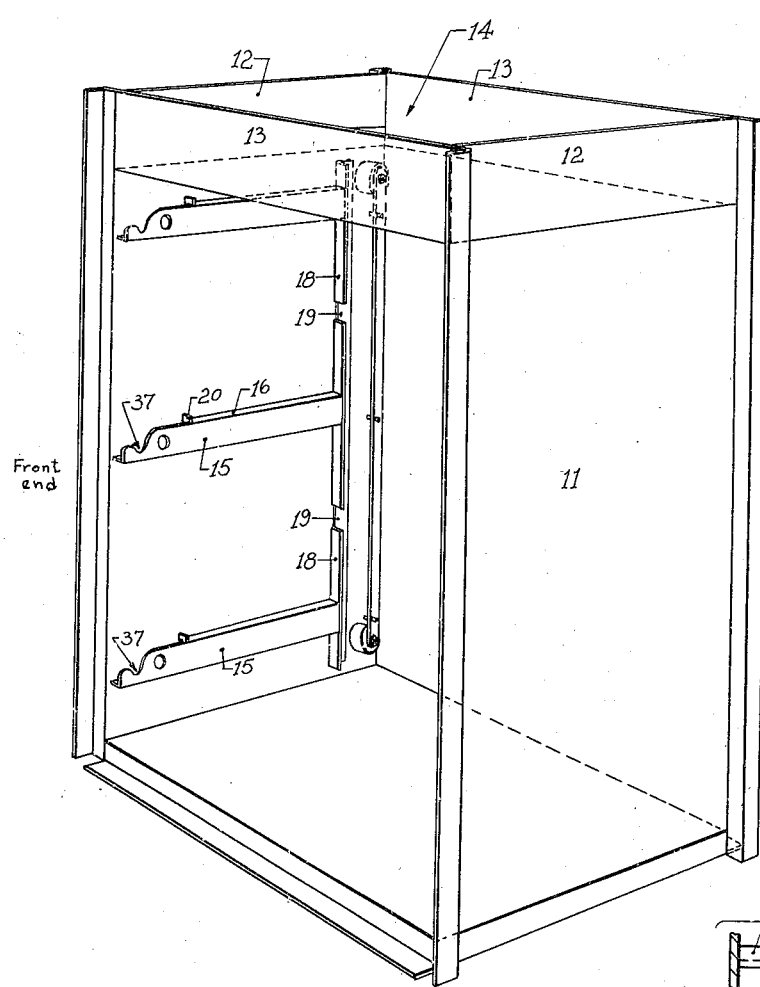
Figure 11 is a perspective view of a housing for electrically opposite assemblies of the general character shown in Figures 4-9.

In Figures 1-3, 4-6 and 7-9, three separate arrangements involving separable and electrically opposite assemblies of spaced parallel plates are illustrated. Figures 1-9 embrace grounded assemblies 1, 3 and 5 and insulated assemblies 2 and 4, each assembly having three pairs of oppositely disposed faces namely, air-flow faces, side faces and end faces.

Each of the assemblies 1 through 5, is composed of a series of spaced parallel plates 6 and securing means, generally designated 7, for rigidly holding the plates in spaced parallel relationship. As indicated in Figure 10, each securing means comprises: a rod, also designated by the numeral 7, passing transversely through the plates 6; a series of spacers 8 mounted on each rod, one spacer between each pair of plates; and a nut 9 threaded to each end of each rod. The securing means 7 is arranged, on each assembly, to leave the spaces between plates sufficiently open and unobstructed internally and peripherally so that electrically opposite assemblies may be moved relatively toward and away from each other to bring them into and out of operative interleaving relationship. It will be understood that the plates of electrically opposite assemblies are in the operative interleaving relationship when successive parallel plates of an assembly of one sign centrally extend into successive spaces between corresponding parallel plates of an assembly of the opposite sign to the extent required for the dust precipitating operation.

Fig. 1-3 arrangement

The first arrangement, illustrated in Figures 1-3, embraces a grounded assembly 1 and an insulated assembly 2. The securing means 7 of the grounded assembly 1 extends along both of its side faces and its air outlet face but leaves its air inlet face unobstructed while the securing means on the insulated assembly extends along its air inlet face only leaving its other faces unobstructed. In the grounded assembly 1, the spaces between plates 6 are unobstructed internally between the marginally disposed securing means and open peripherally along the air outlet face of the assembly. In the insulated assembly 2, the plates 6 project outwardly from the securing means leaving the spaces, between the projecting portions of the plates, open and unobstructed both internally and peripherally.

In the operative interleaving relationship shown in Figures 2 and 3, successive insulated plates project centrally through the spaces between successive grounded plates from the inlet face of the resulting air cleaner to the outlet face thereof. The insulated assembly 2 can be readily moved through the unobstructed air inlet face of the grounded assembly 1 in withdrawing it from and returning it to operative interleaving relationship.

Fig. 4-6 arrangement

The second arrangement, illustrated in Figures 4-6, embraces a pair of grounded assemblies 3 and an insulated assembly 4. The plates 6, of the grounded assemblies 3, project outwardly from the securing means 7, which is disposed along one side face so as to leave the spaces between the projecting portions of the plates open and unobstructed both internally and peripherally. The plates 6 of the insulated assembly 4, project outwardly from both sides of the centrally disposed securing means 7 so as to leave the spaces between the projecting portions of the plates, on each side of the assembly, open and unobstructed both internally and peripherally.

In the operative interleaving relationship, the grounded assemblies 3 are arranged in parallel across the air streams as distinguished from a tandem or serial arrangement along the air stream. They are positioned with their free side faces in opposed relationship spaced to provide an interposed clearance space 10 and with their corresponding plates in planar alignment i. e. aligned with each other in the same plane. The insulated assembly 4 is positioned in the gas cleaning zone between the securing means of the opposed grounded assemblies and is there arranged with its securing means in the clearance space 10 and with its plates projecting from opposite sides of the securing means 7 centrally into the spaces between grounded plates on opposite sides of the clearance space 10. In withdrawing the insulated assembly from and returning it to operative interleaving relationship, it can be moved through either the air inlet or the air outlet faces of the grounded assemblies with its securing means moving through the clearance space.

Fig. 7-9 arrangement

The third arrangement, illustrated in Figures 7-9 is similar to the second arrangement and demonstrates one way of building up or enlarging the latter to increase its capacity. Both second and third arrangements involve a pair of grounded assemblies 3 and an insulated assembly 4 while the third arrangement additionally includes another insulated assembly 4 and a new grounded assembly 5 which, like the assembly 4, has plates 6 projecting outwardly from both sides of a centrally disposed securing means 7. The grounded assembly 5 is arranged in parallel across the air stream and so interposed between and spaced from the pair of grounded assemblies 3 that it cooperates therewith to form an air cleaning zone on one side of its securing means for one insulated assembly 4 and another air cleaning zone on the opposite side of its securing means for the other insulated assembly 4, each zone having a clearance space 10.

In the operative interleaving relationship, the insulated assemblies 4 occupy their respective gas cleaning zones in the manner explained in connection with the single zone of the second arrangement. The insulated assemblies are vertically spaced from each other sufficiently to clear the interposed securing means of the adjacent grounded assembly while their corresponding plates are vertically aligned with each other. Likewise each insulated assembly 4 can be withdrawn from and returned to operative interleaving relationship by moving it through the unobstructed air flow face jointly formed by adjacent grounded assemblies with its securing means moving through the interposed clearance space.

Since assemblies of the character shown in the second and third arrangements are preferred, the housing for such assemblies and the means for mounting such assemblies in such housing are hereafter described.

Housing

The housings used in carrying out the present invention are preferably constructed over a range of sizes capable of accommodating a range of air cleaning zones, the housing 11 illustrated in Figures 11 and 13–15, being made to accommodate three air cleaning zones.

The housing 11 conventionally contains a precipitator chamber open at both ends to accommodate a gas flow therethrough. The front and rear open ends of the housing are specifically referred to herein as air inlet and air outlet ends but the air flow may of course be reversed; hence a reference in the claims to the front end or the rear end does not necessarily refer specifically respectively to the air inlet end or the air outlet end. The chamber-forming wall of the housing is herein referred to as comprising opposed top and bottom walls and opposed side walls but, since the housing may be vertically or horizontally arranged, this terminology is used primarily to distinguish one wall from another and not necessarily for the purpose of defining the position of such wall.

The side walls are extended upwardly beyond the top wall as indicated at 12 while the front and rear ends of the top wall are also extended upwardly as indicated at 13. These upward extensions 12 and 13 cooperate with each other to form an upwardly open chamber 14 at the top of the housing. This chamber provides space for receiving the electrical wiring leading from the power supply to the air cleaning unit.

The housing 11 is arranged so that each assembly may be bodily inserted into and removed from its operative position within the chamber through at least one open end, preferably the front gas inlet end. When the assemblies occupy their operative interleaving relationship in the precipitator chamber, they form a continuous structure extending from one side wall to the other and from the top wall to the bottom wall.

Removable mounting of grounded assemblies

While the grounded assemblies may extend vertically across the precipitator chamber, they preferably extend horizontally across such chamber from one side wall to the other with their plates extending vertically in the direction of the gas flow. These horizontally extending grounded assemblies, when operatively positioned, are engaged, by assembly holding means, along the periphery of the gas flow path, and, through such engagement, are removably mounted upon the chamber-forming wall of the housing. Thus, for example, the lowermost grounded assembly is conveniently supported gravitationally upon the bottom wall of the housing, which constitutes the holding means for that assembly, while the remaining relatively elevated grounded assemblies are supported gravitationally upon the side walls of the housing by end holding means in the form of opposed side wall shelves as hereafter described.

Accordingly, with horizontal assemblies extending transversely across a horizontal gas flow, a pair of end holding shelves are provided on the opposed side walls of the housing for each of the remaining or relatively elevated grounded assemblies. As illustrated in Figures 11–15, each pair of shelves is in the form of opposed horizontally extending U-shaped channel members 15, the upper faces 16 of which provide track ways.

Figure 12:
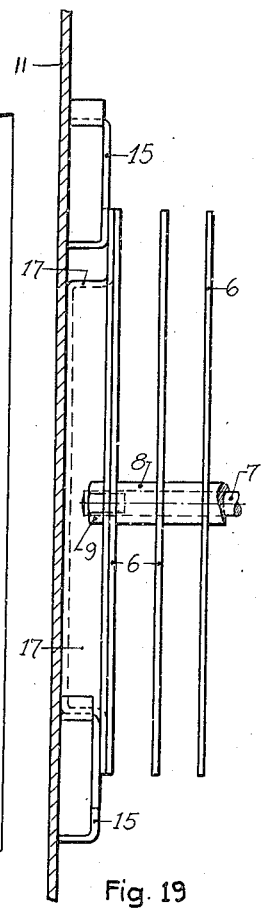
Figure 12 is a fragmentary view showing the means by which an end of a grounded assembly is supported upon the adjacent side wall of the housing.
Figure 13:
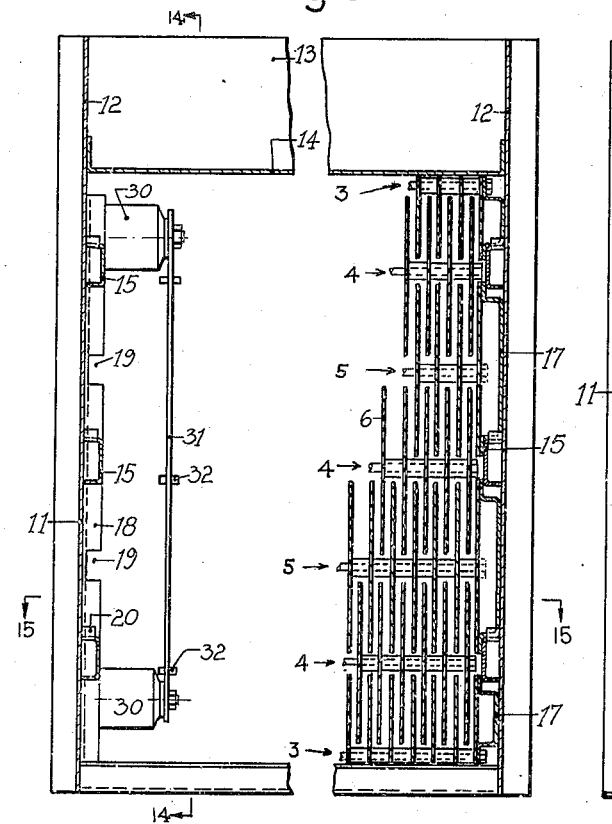
Figure 13 is a partly broken transverse vertical section through the housing with all assemblies in place but broken off at one side.
Figure 14:
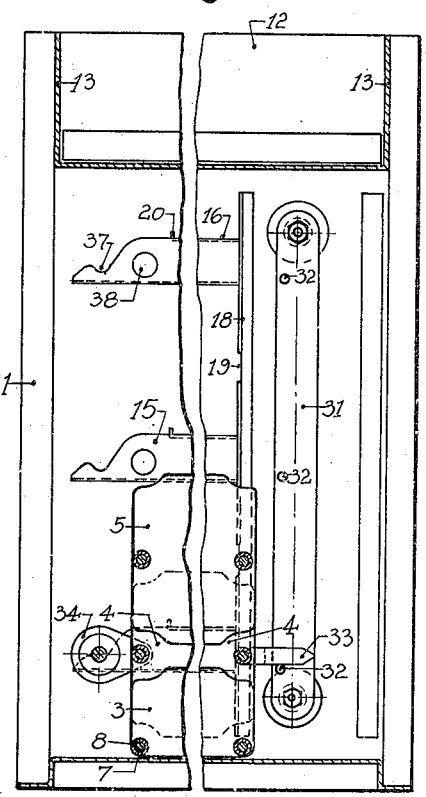
Figure 14 is a longitudinal vertical section along line 14—14 of Figure 13 but showing only a few of the lower assemblies in place.
Figure 15:
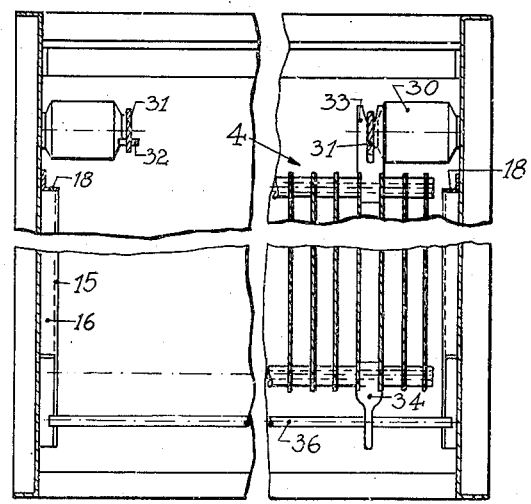
Figure 15 is a horizontal section along lines 15—15 of Figure 13 but showing only an insulated assembly in place.
Figure 16:
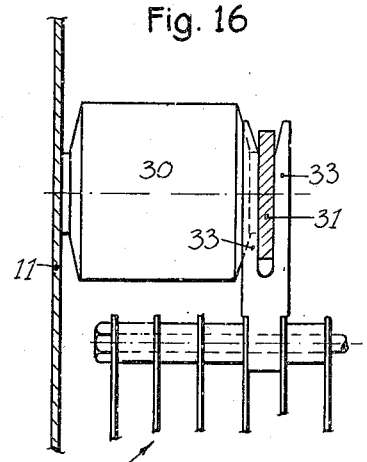
Figure 16 is an enlarged detail of the means for supporting the air outlet end of an insulated assembly.

The horizontal spacing, between each pair of opposed track-providing members 15, is slightly greater than the corresponding distance between the plate electrodes at opposite ends of each grounded assembly. Consequently there is an end space between each end plate electrode of each grounded assembly and the adjacent side wall. To seal this end space, each end of each grounded assembly is provided, as shown in Figures 10, 12 and 13, with a sealing member 17 in the form of a shallow tray positioned with its open end against the adjacent plate.

Each tray 17 is secured to its end plate-electrode by providing its margins with flanges, which lie against the end plate-electrode and which are secured thereto by the front and rear nuts 9 of the securing means and by spot welding. Each tray bridges the space between its end plate electrode and the adjacent side wall of the housing while its bottom surface rests gravitationally upon the upper track 16 of the channel spaced member 15 to support the corresponding end of the grounded assembly gravitationally thereon.

From this it will be seen that a grounded assembly may be inserted through the front air inlet end of the housing 11, at an elevation such as to place the bottom of the end trays 17 upon the tracks 16, and then slidably moved along the tracks to its operative position. To determine its operative position, each opposed side wall of the housing is provided, adjacent its rear outlet end, with a vertically arranged shelf in the form of an angle iron flange 18 rigidly secured to the side wall in position to engage the rear face of the tray 17 at the operative position of the assembly (see Figures 11, 13–15). The flange 18 is recessed at 19 to permit nut 9 of the grounded assembly securing means, to pass through flange 18 when the assembly is moved into and out of its operative position. The lower front corner of the tray 17 is also latched in the operative position by up turning the front end of the track 16 to provide a latching flange 20.

The housing shown in Figure 11 may be rotated 90° to place its front end at the top and its other open end at the bottom so that the air flows vertically through the housing instead of horizontally therethrough. In such case it will be appreciated that the shelf 18 will function as an end holding means.

In Figure 13, it will be noted that the plates 6 of the grounded assemblies 3 and 5 are vertically aligned and clearance spaces 10 provided between them when the lowermost assembly rests upon the bottom wall of the housing and the ends of the remaining superposed assemblies rest upon their respective tracks 16. The unit as a whole is then ready for the insertion of the insulated assemblies 4.

*Removable mounting of the insulated assemblies*

In the unit illustrated, the insulated assemblies are arranged for insertion through the front air inlet end of the housing. As explained before, each insulated assembly is inserted into an air cleaning zone, lying between the securing means 7 of adjacent grounded assemblies, with their frameworks extending into the clearance space between such grounded assemblies. When it reaches its operative position, it is removably supported upon and insulated from the housing at both front and rear ends of the housing. In other words, the grounded assemblies are supported at the sides of the housing while the insulated assemblies are supported at the ends of the housing.

Accordingly, to support the rear end of each insulated assembly, each side wall of the housing is provided, adjacent its rear end and immediately beyond the operative position of the grounded assembly, with a pair of rigidly mounted vertically spaced insulators 30 which insulatedly carry an electrical terminal in the form of a bus bar 31 extending vertically from one insulator to the other and rigidly secured to both. Each bus bar is provided with several pairs of oppositely projecting transverse pins 32, one pair provided on each bar for each assembly and positioned thereon in horizontal alignment with the clearance space 10 for such assembly. The framework of each insulated assembly carries, at its rear end, a pair of horizontally spaced forks 33 which are positioned to straddle the bus bars 31 immediately above the pins 32 in the operative position of the insulated assembly. In Figures 1-3 and 1a the corresponding forks 33a are shown as part of adjacent plate electrodes. Accordingly, as the insulated assembly enters its operative position, the forks 33 straddle their respective bus bars 31 in a position such that the forks engage and rest upon the upper side of the pins 32. In this way the rear end of each insulated assembly is not only mechanically supported on the pins 32 but also electrically connected to the bus bars 31 and insulated from the housing 11, by the insulators 30.

Figure 19:
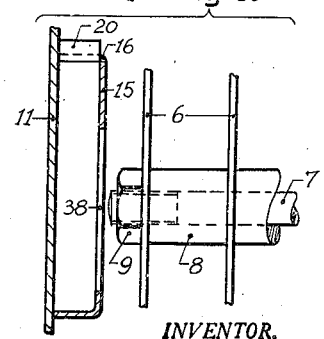
Figure 19 is an enlarged detail showing the manner in which the securing means at the front end of an insulated assembly is spaced from the adjacent side wall structure of the housing.
Figure 17:
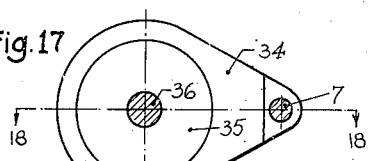
Figure 17 is an enlarged detail of the insulator lug used to support the air inlet end of an insulated assembly.
Figure 18:
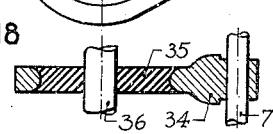
Figure 18 is a section along line 18—18 of Figure 17.

To support and insulate the front ends of the insulated assemblies 4, the front framework rod 7 of each assembly is provided with a pair of horizontally spaced lugs 34 which project outwardly through the air inlet face of the insulated assembly. The projecting end of each lug 34 contains an opening in which an insulator 35 is rigidly mounted. The insulators 35 are centrally bored to receive a cross bar 36 which is thus insulated from the assembly. The ends of cross bars 36 extend laterally to the side walls of the housing where they engage in latching grooves 37 at the front ends of opposed channel track-providing members 15. When an insulated assembly 4 is latched in operative interleaving relationship by the engagement of its cross bar 36 in the latching grooves 37 of opposed member 15, each securing nut 9 at the front end of the insulated assembly is spaced very slightly from the adjacent track providing member 15. To increase the spacing to safe proportions, each member 15 is provided with an opening 38 which is aligned with the adjacent securing means nut 9 and made large enough to afford the requisite spacing (see Figure 19).

*Operation*

From the foregoing, it will be appreciated: that the housing and the assemblies are so constructed and arranged that each assembly may bodily be manually inserted into and removed from its operative position within the housing through an open end of the housing; that each operatively positioned grounded assembly is engaged, by the holding means along the periphery of the gas flow path, and, through such engagement, is removably mounted and electrically grounded upon the chamber-forming wall of the housing; that each operatively positioned insulated assembly is engaged, by the holding means, at its front and rear ends, and, through such engagement, is removably mounted upon relatively front and rear portions of the housing; that the holding means for each insulated assembly includes separable front and rear connections, embracing a member extending transversely across the gas flow path adjacent each of the opposite air flow faces of the assembly and means connecting each member both to the housing and to the adjacent portion of the assembly, one of the two connections to each transverse member being separable; and that each insulated assembly is electrically insulated by means of insulation in each separable front and rear connection.

In operation, the grounded assemblies 3 and 5 are inserted first and removed last since their insertion and removal otherwise is prevented by the lugs 24 of the insulated assemblies 4. After the grounded assemblies are in place the insulated assemblies 4 are inserted. An ionizer may be either permanently or removably positioned at the rear end of the unit or, after the assemblies have been inserted, removably mounted adjacent the front end of the unit. Thereupon the ionizer and the plate assemblies are charged with appropriate operating voltages and an air flow created in a direction such as to pass through the ionizer first and the plates last. After a period of operation the installation may be shut down and the plates cleaned in the normal manner. When it is desired to effect a thorough cleaning of the plates, the installation is shut down, the assemblies removed from the housing and replaced with clean spare assemblies. The removed assemblies may then be thoroughly cleaned in any suitable manner at any appropriate place and then used as spares to replace dirty assemblies from the same or some other unit.

Having described my invention, I claim:

1. An electrical dust-precipitating unit comprising: a housing having a precipitator chamber open at opposite ends to accommodate a gas flow longitudinally therethrough; at least two separable and electrically opposite unitary assemblies of spaced-parallel plate electrodes operatively positioned stationarily within the chamber to extend transversely across the gas flow path with their plates extending longitudinally along the gas flow path in operative interleaving relationship so that successive plates of one assembly extend into successive spaces between plates of the electrically opposite assembly and cooperate therewith to form a series of longitudinal gas flow passages; and mounting means for centering and supporting each assembly, and for removably holding at least one assembly, in its operative position, said means including means for electrically insulating one assembly from the other; the housing and both assemblies being so constructed and arranged that said removably mounted assembly as a unit may bodily be manually inserted into and removed from its operative position within the housing by moving it longitudinally through an open end of the housing.

2. The unit of claim 1 wherein: said removably mounted operatively positioned assembly is engaged along its transverse periphery by mounting means and, through such engagement, is removably mounted upon the chamber forming wall of the housing.

3. The unit of claim 1 wherein: the mounting means for said removable assembly includes members mounted on opposed chamber forming walls of the housing to provide opposed track ways on the housing for engaging and removably supporting said assembly at its opposite transverse ends.

4. The unit of claim 1 wherein: the mounting means for said removably mounted operatively positioned assembly separably connects said assembly at its opposite longitudinal or front and rear air flow faces respectively to relatively front and rear portions of the housing.

5. The unit of claim 1 wherein the mounting means for said removable operatively positioned assembly includes a member extending transversely across the gas flow path adjacent one air flow face of the assembly; and means connecting said transverse member both to the housing and to the adjacent portion of the assembly, one of the two connections to such transverse member being readily separable.

6. The unit of claim 1 wherein the mounting means for said removable assembly, together with said insulating means, include: an electrical bus bar insulatedly mounted adjacent the rear air flow end of the housing; and means, secured to and projecting outwardly from the adjacent rear air flow face of said assembly, for engaging said bus bar to insulate and removably hold the rear air flow end of said assembly in its operative position.

7. The unit of claim 1 wherein the mounting means for said removable assembly, together with said insulating means, include: at least one lug mounted on such assembly to project outwardly from the front air flow face thereof; a cross bar carried by said lug; means on the walls of the housing adjacent the front end thereof for engaging opposite ends of said cross bar to hold the front air flow end of said assembly in its operative position; and means for electrically insulating the assembly lugs from said housing walls.

8. The unit of claim 1 wherein: one operatively positioned assembly is engaged along its transverse periphery by the mounting means and, through such engagement, is removably mounted and electrically grounded upon the chamber-forming wall of the housing; the other operatively positioned assembly is engaged at its front and rear ends by the mounting means and, through such engagement, is removably mounted upon relatively front and rear portions of the housing; and the insulating means includes insulation in the mounting means at the front and rear ends of said other assembly for separating said assembly electrically from the housing.

9. An electrical dust-precipitating unit comprising: a housing having a precipitator chamber open at opposite ends to accommodate a gas flow longitudinally therethrough; a pair of unitary spaced-parallel plate-electrode assemblies of one sign operatively positioned stationarily within the housing to extend in parallel transversely across adjacent sections of the gas flow path therethrough in spaced opposed relationship with a clearance space extending longitudinally therebetween from the inlet air flow face to the outlet air flow face, the corresponding plates of said pair of assemblies extending longitudinally in the general direction of the gas flow and being in planar alignment with each other with the spaces between the plates of each assembly in open communication with said interposed clearance space; an electrically-opposite spaced-parallel plate-electrode assembly operatively positioned stationarily within the housing with its plates in operative interleaving relationship with the plates of said pair of assemblies so that successive plates of said electrically-opposite assembly extend from said clearance space into successive spaces between plates of said pair of assemblies and cooperate therewith to form a series of longitudinal gas flow passages; and mounting means for centering and removably supporting each assembly in its operative position, said means including means for electrically insulating the electrically-opposite assembly from said pair of assemblies; the housing and said assemblies being so constructed and arranged that each assembly as a unit may bodily be manually inserted into and removed from its operative position within the housing by moving it longitudinally through an open end of the housing.

10. The unit of claim 9 wherein each of said pair of assemblies is engaged along its transverse periphery by the mounting means and, through such engagement, is removably supported and electrically grounded upon the chamber-forming walls of the housing.

11. The unit of claim 9 wherein said operatively-positioned electrically-opposite assembly is engaged at its front and rear ends by the mounting means and, through such engagement, is removably mounted upon and electrically insulated from relatively front and rear portions of the housing.

12. The unit of claim 9 wherein the mounting means for said removable operatively-positioned electrically-opposite assembly include; a member extending transversely across the gas flow path adjacent one air flow face of such assembly; and means connecting said transverse member both to the housing and to the adjacent portion of the assembly, one of the two connections to such transverse member being readily separable.

13. The unit of claim 9 wherein the mounting means for said electrically opposite assembly, together with said insulating means, includes: a bus bar insulatedly mounted on the housing adjacent the rear end thereof; means on the rear end of said electrically opposite assembly for engaging said bus bar; at least one lug mounted on such assembly to project outwardly from the front end thereof; a cross bar carried by said lug and extending transversely therefrom toward the front end portion of the housing wall; means on the front end portion of said housing wall for gravitationally supporting the adjacent end of said cross bar; and means for electrically insulating the assembly lug from said housing wall.

14. The unit of claim 9 wherein: the plates of said electrically opposite assembly project transversely outward from both sides of a centrally disposed securing means for holding the plates of the assembly as a unit; and the clearance space between the adjacent other assemblies is arranged to accommodate said securing means to facilitate assembly insertion and removal.

15. The unit of claim 9 wherein through said mounting means; said pair of assemblies is removably supported and electrically grounded, along their transverse peripheries, upon the chamber-forming wall of the housing; and the front and rear ends of said electrically opposite assembly are removably supported upon and electrically insulated from relatively front and rear portions of the housing.

16. The unit of claim 9 wherein: the top and side walls of the housing are extended upward to form a top chamber to accommodate electrical wiring leading from a power supply to the unit.

17. An electrical dust-precipitating unit comprising: a housing having a precipitator chamber which is open at opposite ends to accommodate a gas flow longitudinally therethrough, said precipitator chamber containing at least two adjacent parallel air cleaning zones; a unitary series of spaced-parallel plate-electrodes of one sign operatively positioned stationarily in each half of each zone, each series extending within its half of the zone across the gas-flow therethrough and being spaced from and in opposed relationship to the series in the other half of the same zone so that a clearance space is provided between series at the middle of each zone, the corresponding plates of opposed series in each zone extending longitudinally in the general direction of the gas-flow and being in planar alignment with each other, the spaces between plates in each zone being in open communication with the clearance space of said zone; an electrically opposite unitary series of spaced-parallel plate-electrodes operatively positioned stationarily in each zone with its plates in operative interleaving relationship with the plates of both series of one sign in the same zone so that successive plates of said electrically opposite assembly extend into successive spaces between plates of both of said series of one sign and cooperate therewith to form a succession of gas longitudinal flow passages; and mounting means for centering and removably supporting each series in its operative position, said means including means for insulating all series of one sign from all electrically opposite series; the housing and each series being so constructed and arranged that each series as a unit may bodily be manually inserted into and removed from its operative position within the housing by moving it longitudinally through an open end of the housing.

18. An electrical dust precipitating unit comprising: a housing having open front and rear ends and a precipitator chamber therebetween to accommodate a gas flow therethrough; first and second unitary plate assemblies of electrically opposite signs respectively, each composed of a plurality of spaced parallel plate electrodes and each arranged for insertion bodily as a unit through the front open end of said housing into an operative position within said chamber with its plates in operative spaced interleaving relationship with the plates of the other operatively positioned assembly; the chamber forming housing wall being arranged to engage said first assembly at one or more points along the periphery of the gas flow so as to support it in its operative inserted position; and means for supporting and centering said second assembly in its operative position from its front and rear ends.

19. The unit of claim 18 wherein the supporting and centering means includes a rear member secured to said housing to extend transversely across the gas flow in a position spaced rearwardly from the operative inserted position of said first assembly, said rear member being arranged to connect with and disconnect from the rear end of the second assembly as the second assembly is inserted into and removed from its operative position.

20. The unit of claim 18 wherein said supporting and centering means includes a front member secured to the front end of said second assembly and so arranged that, when the second assembly is in its operative inserted position, the front member extends transversely across the gas flow in a position spaced forwardly from the operative inserted position of said first assembly, said front member being arranged to connect with and disconnect from the front end of the housing as the second assembly is inserted into and removed from its operative position.

21. The unit of claim 18 wherein said supporting and centering means includes front and rear lugs rigidly secured to the second assembly to project from the front and rear ends thereof respectively and front and rear transverse members, the front transverse member being rigidly secured to the front lug and arranged to connect with and disconnect from the front end portion of the housing as the second assembly is inserted into and removed from its operative position, and the rear transverse member being rigidly secured to the rear end portion of the housing and arranged to connect with and disconnect from the rear lug as the second assembly is inserted into and removed from its operative position.

22. An electrical dust-precipitating unit comprising: a housing having an open-ended precipitator chamber therein; opposed track members on opposite side walls of the chamber extending from a position adjacent one open end of the chamber inwardly thereof; a unitary plate assembly formed of a plurality of spaced parallel plate electrodes of a predetermined electrical sign and arranged for insertion bodily as a unit through said one open end of said chamber onto said track members; a member secured to said housing and extending transversely across the chamber adjacent the inner end of said track members; a second unitary plate assembly formed of a plurality of spaced parallel plate electrodes of the opposite electrical sign, said second assembly having front and rear ends; means for supporting the rear end of said second assembly on said transverse member as said second assembly is positioned in the chamber with the plates thereof in interleaving relation with the plates of the first assembly; and means adjacent said one end of the chamber to engage and lock the front end of said second assembly in operative relation with the first assembly.

23. An electrical dust-precipitating unit comprising: a housing having an open-ended precipitator chamber therein; opposed shelves on opposite side walls of the chamber extending from a point adjacent one open end of the chamber inwardly thereof; a unitary plate assembly formed of a plurality of spaced parallel plate electrodes arranged to be inserted bodily as a unit through said one open end of the chamber onto said shelves; and means secured to and extending from each end of said plate assembly over said shelves into substantial sealing contact with the adjacent walls of the chamber.

24. The unit of claim 23 wherein said last-mentioned means includes a tray-shaped member having its open face secured adjacent the end plates of the plate assembly, a side wall thereof resting upon a shelf, and its bottom in substantial sealing contact with the adjacent wall of the chamber.

VERNER DAHLMAN.

REFERENCES CITED

The following references are of record in the file of this patent:

UNITED STATES PATENTS

| Number | Name | Date |
|---|---|---|
| 1,357,466 | Moller | Nov. 2, 1920 |
| 1,405,125 | Harris | Jan. 31, 1922 |
| 1,430,294 | Eddy | Sept. 26, 1922 |
| 1,467,003 | Land | Sept. 4, 1923 |
| 1,568,274 | Grimes | Jan. 5, 1926 |
| 1,573,379 | Dickerson | Feb. 16, 1926 |
| 1,789,263 | Nyman | Jan. 13, 1931 |
| 2,285,499 | Dietsch | June 9, 1942 |
| 2,297,933 | Yonkers | Oct. 6, 1942 |

FOREIGN PATENTS

| Number | Country | Date |
|---|---|---|
| 446,862 | Germany | July 12, 1927 |